US011480981B2

(12) United States Patent
Kondo et al.

(10) Patent No.: US 11,480,981 B2
(45) Date of Patent: Oct. 25, 2022

(54) TEMPERATURE CONTROL APPARATUS, TEMPERATURE CONTROL METHOD, COMPUTER PROGRAM, AND RECORDING MEDIUM

(71) Applicants: PIONEER CORPORATION, Tokyo (JP); NIKKISO COMPANY LIMITED, Tokyo (JP)

(72) Inventors: Tadashi Kondo, Kawagoe (JP); Kiyoshi Tateishi, Kawagoe (JP); Tomoya Murakami, Makinohara (JP); Akari Agata, Makinohara (JP); Genki Adachi, Makinohara (JP)

(73) Assignees: AIR WATER BIODESIGN INC., Hyogo (JP); NIKKISO COMPANY LIMITED, Tokyo (JP)

( * ) Notice: Subject to any disclaimer, the term of this patent is extended or adjusted under 35 U.S.C. 154(b) by 294 days.

(21) Appl. No.: 16/489,408

(22) PCT Filed: Feb. 28, 2017

(86) PCT No.: PCT/JP2017/007871
§ 371 (c)(1),
(2) Date: Aug. 28, 2019

(87) PCT Pub. No.: WO2018/158837
PCT Pub. Date: Sep. 7, 2018

(65) Prior Publication Data
US 2020/0026315 A1    Jan. 23, 2020

(51) Int. Cl.
*G05D 23/00* (2006.01)
*G05D 23/30* (2006.01)
*G05D 23/24* (2006.01)

(52) U.S. Cl.
CPC ........... *G05D 23/303* (2013.01); *G05D 23/00* (2013.01); *G05D 23/24* (2013.01)

(58) Field of Classification Search
None
See application file for complete search history.

(56) References Cited

U.S. PATENT DOCUMENTS 5,603,570 A * 2/1997 Shimizu ............. G05D 23/1917
374/100
6,229,832 B1 * 5/2001 Baba ..................... H01S 5/0687
372/33

(Continued)

FOREIGN PATENT DOCUMENTS

CN    1661642 A    8/2005
EP    1569054 A2    8/2005

(Continued)

OTHER PUBLICATIONS

International Search Report, dated May 23, 2017, from corresponding PCT application No. PCT/JP2017/007871.

*Primary Examiner* — Jennifer L Norton
(74) *Attorney, Agent, or Firm* — Nixon & Vanderhye

(57) ABSTRACT

This temperature control device is provided with: an endothermic/exothermic unit that heats or cools a subject to be subjected to temperature control; a temperature detection unit that detects the first temperature of the periphery of the subject; a control unit that controls the endothermic/exothermic unit on the basis of a variable target temperature; and a variable target temperature setter that sets the variable target temperature to a first variable target temperature on the basis of the first temperature and target temperature information indicating the target temperature. With such temperature control device, since the target temperature changes to a suitable value as needed, a time needed until the temperature of the subject reaches the target temperature can be shortened.

8 Claims, 18 Drawing Sheets

(56) References Cited

U.S. PATENT DOCUMENTS

| | | | |
|---|---|---|---|
| 6,408,013 B1* | 6/2002 | Akagi | G11B 7/126 |
| 6,896,404 B2 | 5/2005 | Seki et al. | |
| 7,218,999 B2 | 5/2007 | Matsunaga et al. | |
| 2003/0118074 A1 | 6/2003 | Seki et al. | |
| 2004/0122559 A1* | 6/2004 | Young | G05D 23/1913 |
| | | | 700/269 |
| 2005/0192681 A1 | 9/2005 | Matsunaga et al. | |
| 2006/0159141 A1* | 7/2006 | Uchida | H01S 5/02415 |
| | | | 372/38.01 |
| 2011/0006124 A1* | 1/2011 | Kai | G05D 23/1919 |
| | | | 236/46 R |
| 2018/0041007 A1* | 2/2018 | Ashida | H01S 5/0612 |
| 2018/0301867 A1* | 10/2018 | Shimizu | H01S 5/02476 |
| 2019/0097390 A1* | 3/2019 | Shimizu | H01S 5/02415 |

FOREIGN PATENT DOCUMENTS

| | | | |
|---|---|---|---|
| EP | 1742133 A2 * | 1/2007 | G05D 23/1917 |
| JP | S63-191989 A | 8/1988 | |
| JP | H05-333944 A | 12/1993 | |
| JP | H09-282004 A | 10/1997 | |
| JP | 2003-195952 A | 7/2003 | |
| JP | 2005-276169 A | 10/2005 | |
| JP | 2011-034386 A | 2/2011 | |
| KR | 10-0944660 B1 | 3/2010 | |
| WO | 2016-092872 A1 | 6/2016 | |

* cited by examiner

TEMPERATURE CONTROL APPARATUS, TEMPERATURE CONTROL METHOD, COMPUTER PROGRAM, AND RECORDING MEDIUM

TECHNICAL FIELD

The present invention relates to a temperature control apparatus for and a temperature control method of controlling heat adsorption or heat radiation of a temperature control target, as well as a computer program and a recording medium.

BACKGROUND ART

For this type of apparatus, there is known an apparatus configured to control a temperature of the temperature control target by using a heat (or heat-quantity) transfer element, such as, for example, a Peltier element. For example, Patent Literature 1 discloses an apparatus configured to feed back the temperature of a semiconductor laser to bring it close to a predetermined target temperature.

CITATION LIST

Patent Literature

Patent Literature 1: Japanese Patent Application Laid Open No. S63-191989

SUMMARY OF INVENTION

Technical Problem

When a temperature control is performed by setting the target temperature, overshooting or hunting may occur if there is a large temperature difference between a current temperature and the target temperature. Thus, even if rapid heating or cooling is performed, it requires a relatively long period to stabilize the temperature of the temperature control target at the target temperature, which is technically problematic.

The above is an example of problems to be solved by the present invention. It is therefore an object of the present invention to provide a temperature control apparatus and a temperature control method that can preferably perform the temperature control by controlling the heat adsorption or heat radiation of the temperature control target, as well as a computer program and a recording medium.

Solution to Problem

The above object of the present invention can be achieved by a temperature control apparatus provided with: a heat absorbing/radiating device configured to heat or cool a temperature control target; a temperature detecting device configured to detect a first temperature around the temperature control target; a controlling device configured to control the heat absorbing/radiating device on the basis of a variable target temperature; and a variable temperature setting device configured to set the variable target temperature to a first variable target temperature on the basis of the first temperature and target temperature information indicating a target temperature.

The above object of the present invention can be achieved by a temperature control method provided with: a temperature detecting process of detecting a first temperature around the temperature control target; a controlling device process of controlling the heat absorbing/radiating device on the basis of a variable target temperature; and a variable temperature setting process of setting the variable target temperature to a first variable target temperature on the basis of the first temperature and target temperature information indicating a target temperature.

The above object of the present invention can be achieved by a computer program used for a temperature control apparatus including a heat absorbing/radiating device configured to heat or cool a temperature control target, the computer program allowing the temperature control apparatus to perform: a temperature detecting process of detecting a first temperature around the temperature control target; a controlling device process of controlling the heat absorbing/radiating device on the basis of a variable target temperature; and a variable temperature setting process of setting the variable target temperature to a first variable target temperature on the basis of the first temperature and target temperature information indicating a target temperature.

The above object of the present invention can be achieved by a recording medium on which the computer program described above is recorded.

DESCRIPTION OF EMBODIMENTS

<1>

Figure 1:
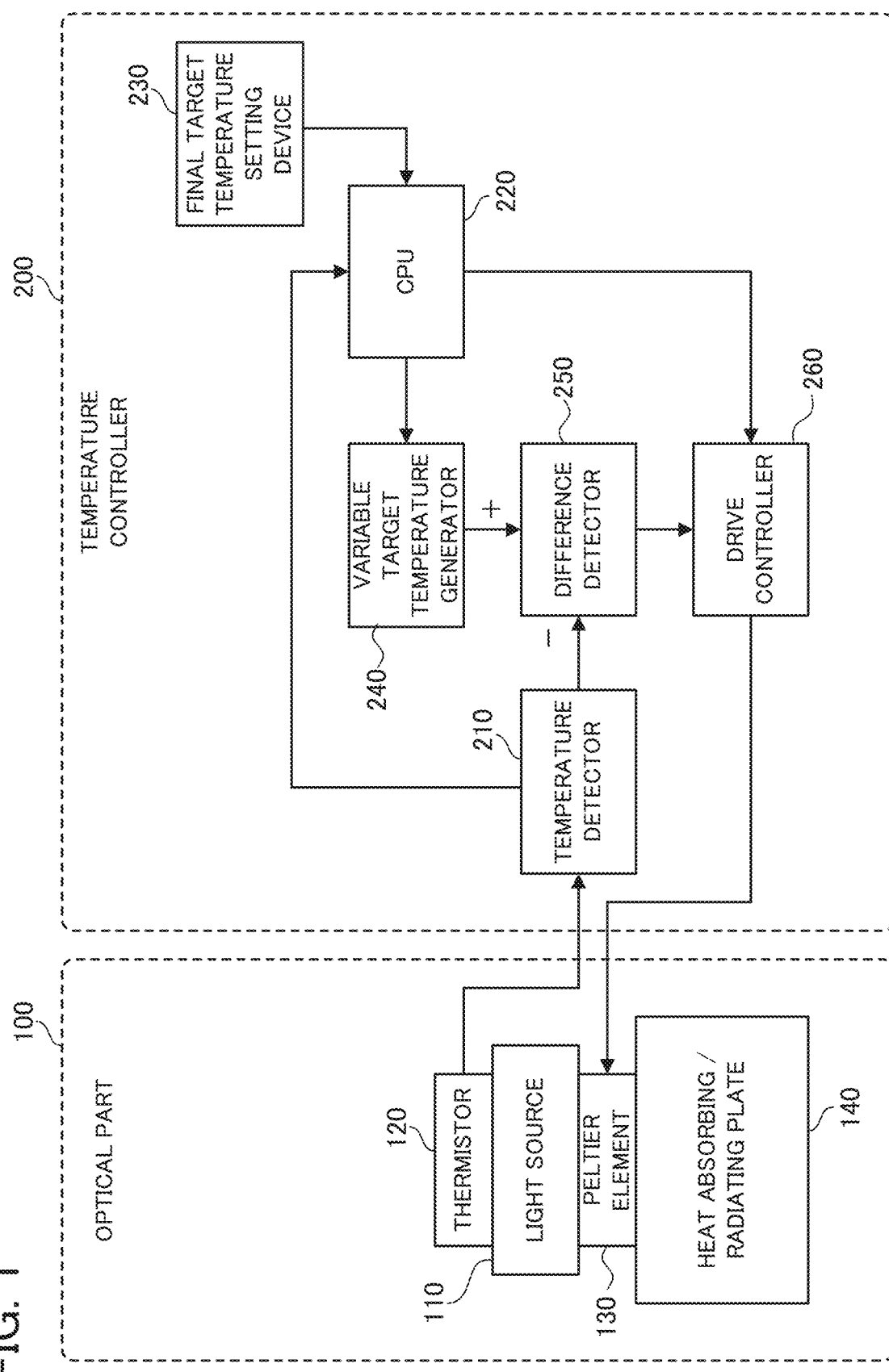
FIG. 1 is a block diagram illustrating a configuration of a temperature control apparatus according to a practical example.

A control temperature apparatus according to an embodiment is provided with: a heat absorbing/radiating device configured to heat or cool a temperature control target; a temperature detecting device configured to detect a first temperature around the temperature control target; a controlling device configured to control the heat absorbing/radiating device on the basis of a variable target temperature; and a variable temperature setting device configured to set the variable target temperature to a first variable target temperature on the basis of the first temperature and target temperature information indicating a target temperature.

In operation of the control temperature apparatus according to the embodiment, a temperature of the temperature control target is controlled by heating or cooling performed by the heat absorbing/radiating device. Specifically, the heating or cooling performed by the heat absorbing/radiating device is controlled on the basis of the first temperature around the temperature control target and the target temperature information, by which a control is performed to bring the temperature of the temperature control target close to the target temperature.

Here, particularly in the embodiment, the target temperature of a temperature control is set as the variable target temperature (i.e., a variable value). The variable target temperature is set as the first variable target temperature on the bass of the first temperature around the temperature control target and the target temperature information.

By using the variable target temperature in this manner, it is possible to perform the temperature control, more preferably, for example, than when using the target temperature that is a fixed value to perform the temperature control. For example, when the temperature control target is heated or cooled, overshooting or undershooting may occur due to a thermal delay or the like. In view of such behavior, an appropriate temperature control can be performed. More specifically, by setting an initial target temperature to a value that is less or greater than an actual target temperature on the premise of the overshooting or undershooting, it is possible to reduce a time required to reach the target temperature (i.e., a time required to be stabilized at the target temperature).

<2>

In an aspect of the control temperature apparatus according to the embodiment, the variable temperature setting device is configured to set the first variable target temperature so that a temperature that allows formation of a peak of overshooting or a bottom of undershooting for the first variable target temperature of the first temperature is the target temperature.

According to this aspect, even if the overshooting or undershooting occurs, the temperature control target is not heated to a value that is greater than the target temperature, or is not cooled to a value that is less than the target temperature. Therefore, the temperature of the temperature control target is allowed to reach the target temperature in a short period.

<3>

In another aspect of the control temperature apparatus according to the embodiment, the variable temperature setting device is configured to set the variable target temperature to a second variable target temperature, which is closer to the target temperature than the first variable target temperature is, if a change in the first temperature to the peak or the bottom is detected after the first temperature is set to the first variable target temperature.

After the heating or cooling is performed by the heat absorbing/radiating device and the temperature of the temperature control target reaches the first variable target temperature, the heating or cooling is stopped. Alternatively, a reverse control is performed to solve an excessive temperature due to the overshooting or undershooting. Thus, a temperature change amount of the first temperature gradually changes to be a smaller value after reaching the first variable target temperature.

In this aspect, if the change in the first temperature reaches the peak or the bottom after the first temperature is set to the first variable target temperature, the variable target temperature is set to the second variable target temperature, which is closer to the target temperature than the first variable target temperature is. By changing the variable target temperature in this manner, a new variable target temperature is set at a time point at which the first temperature is heated or cooled to an appropriate temperature (e.g., near a point close to the peak of overshooting or the bottom of undershooting). It is thus possible to perform the temperature control, extremely efficiently.

If the temperature change in the first temperature reaches the peak or the bottom, the variable target temperature is set to the second variable target temperature, which is closer to the target temperature than the first variable target temperature is. If the first variable target temperature is greater than the first temperature when the first variable target temperature is set, the temperature change amount of the first temperature is less than or equal to a first predetermined value. By this, it is possible to detect the peak of overshooting of the temperature change in the first temperature. Moreover, if the first variable target temperature is less than the first temperature when the first variable target temperature is set, the temperature change amount of the first temperature is greater than or equal to the first predetermined value. By this, it is possible to detect the bottom of undershooting of the temperature change in the first temperature.

<4>

In the aspect in which the variable target temperature is set to the second variable target temperature, the variable temperature setting device may be configured (i) to detect the change to the peak, based on that a change in the first temperature is less than or equal to a first predetermined value, if the first temperature in setting the first variable target temperature is less than the variable target temperature, and (ii) to detect the change to the bottom, based on that the change in the first temperature is greater than or equal to the first predetermined value, if the first temperature in setting the first variable target temperature is greater than the variable target temperature.

In this case, if the first variable target temperature is greater than the first temperature (in other words, in heating), when the temperature change amount of the first temperature is less than or equal to the first predetermined value, it is detected that the temperature change in the first temperature reaches the peak of overshooting. Moreover, if the first variable target temperature is less than the first temperature (in other words, in cooling), when the temperature change amount of the first temperature is greater than or equal to the first predetermined value, it is detected that the temperature change in the first temperature reaches the bottom of undershooting.

The "first predetermined value" may be a value set in advance to determine that the change amount of the first temperature is sufficiently small, and may be set, for example, as a value that is 0 or is extremely close to 0. If the first variable target temperature is greater than the first temperature when the first variable target temperature is set, for example, a value of 0.0001 or the like may be set as the first predetermined value. If the first variable target temperature is less than the first temperature when the first variable target temperature is set, for example, a value of −0.0001 or the like may be set as the first predetermined value. If a value that is slightly greater or less than 0 is set as the first predetermined value, even if the peak or bottom of the temperature change is a stable temperature without a change, i.e., even if the temperature change amount stays at 0, this can be detected as a change. Thus, the value that is slightly greater or less than 0 is more preferable as the first predetermined value.

<5>

In another aspect of the control temperature apparatus according to the embodiment, the variable temperature setting device is configured to set the variable target temperature, on the basis of a ratio of a difference between a temperature that allows formation of the peak or the bottom for the target temperature of the first temperature and an initial temperature, which is the first temperature before the heat absorbing/radiating device is controlled, and a difference between the target temperature and the initial temperature.

According to this aspect, in view of the occurrence of overshooting or undershooting, it is possible to set the variable target temperature that does not allow unnecessary heating or cooling to be performed. It is thus possible to control the temperature of the temperature control target, more preferably.

<6>

In another aspect of the control temperature apparatus according to the embodiment, the variable temperature setting device is configured to repeatedly set the variable target temperature so that the variable target temperature gradually approaches the target temperature.

According to this aspect, the same algorithm as the one when the first target temperature is set for the second target temperature is repeatedly performed, and the variable target temperature is gradually brought close to the target temperature. It is thus possible to perform the temperature control, extremely simply, even when the variable target temperature is changed multiple times.

<7>

In another aspect of the control temperature apparatus according to the embodiment, the variable temperature setting device is configured to set the variable target temperature to the target temperature if a difference between the target temperature and the variable target temperature is less than or equal to a second predetermined value.

If the temperature control is performed by using the variable target temperature, the variable target temperature is gradually changed to a value that is close to the target temperature. When the variable target temperature approaches the target temperature to a certain degree and the temperature change becomes small, the variable target temperature may asymptotically come close to a temperature that slightly deviates from the target temperature, and it may take a time for the temperature of the temperature control target to converge on the target temperature.

Particularly in this aspect, however, if the difference between the target temperature and the variable target temperature is less than or equal to the second predetermined value, the variable target temperature is set to the target temperature. The "second predetermined value" may be a value set as a pull-in range of the variable target temperature, and the variable target temperature is set to a final target temperature, forcibly (in other words, regardless of a change algorithm used so far), at a time point at which the difference between the target temperature and the variable target temperature is less than or equal to the second predetermined value. Thus, the detrimental effect described above is avoided, and the temperature of the temperature control target is allowed to reach the target temperature in a short period.

<8>

In another aspect of the control temperature apparatus according to the embodiment, the variable temperature setting device is configured to bring the variable target temperature close to the target temperature with a granularity that is greater than or equal to a third predetermined value.

According to this aspect, the variable target temperature is brought close to the target temperature with the granularity that is greater than or equal to the third predetermined value. Thus, the variable target temperature is prevented from changing, extremely slightly. As a result, it is possible to avoid a situation in which the variable target temperature asymptotically comes close to a temperature that does not reach the target temperature, and it is possible to certainly make the first temperature eventually reach the target temperature.

<9>

A control temperature method according to an embodiment is a temperature control method using a temperature control apparatus including a heat absorbing/radiating device configured to heat or cool a temperature control target, the temperature control method provided with: a temperature detecting process of detecting a first temperature around the temperature control target; a controlling device process of controlling the heat absorbing/radiating device on the basis of a variable target temperature; and a variable temperature setting process of setting the variable target temperature to a first variable target temperature on the basis of the first temperature and target temperature information indicating a target temperature.

According to the temperature control method in the embodiment, it is possible to preferably control the temperature of the temperature control target even when the overshooting or undershooting occurs, as in the temperature control apparatus according to the embodiment described above.

Even in the temperature control method according to the embodiment, it is possible to adopt the same various aspects as those of the temperature control apparatus according to the embodiment described above.

<10>

A computer program according to an embodiment is a computer program used for a temperature control apparatus including a heat absorbing/radiating device configured to heat or cool a temperature control target, the computer program allowing the temperature control apparatus to perform: a temperature detecting process of detecting a first temperature around the temperature control target; a controlling device process of controlling the heat absorbing/ radiating device on the basis of a variable target temperature; and a variable temperature setting process of setting the variable target temperature to a first variable target temperature on the basis of the first temperature and target temperature information indicating a target temperature.

According to the computer program in the embodiment, it is possible to preferably control the temperature of the temperature control target even when the overshooting or undershooting occurs, by allowing the implementation of the same processes as those of the temperature control method according to the embodiment described above.

Even in the computer program according to the embodiment, it is possible to adopt the same various aspects as those of the temperature control apparatus according to the embodiment described above.

<11>

On a recording medium according to an embodiment, the computer program according to the embodiment described above is recorded.

According to the recording medium in the embodiment, it is possible to preferably control the temperature of the temperature control target even when the overshooting or undershooting occurs, by allowing the implementation of the computer program according to the embodiment described above.

The operation and other advantages of the temperature control apparatus, the temperature control method, the computer program, and the recording medium according to the embodiments will be explained in more detail in the following practical example.

Practical Example

Hereinafter, a temperature control apparatus, a temperature control method, a computer program, and a recording medium according to the practical example will be explained in detail with reference to the drawings.

<Configuration of Apparatus>

Firstly, a configuration of the temperature control apparatus according to the practical example will be explained with reference to FIG. 1. FIG. 1 is a block diagram illustrating the configuration of the temperature control apparatus according to the practical example.

As illustrated in FIG. 1, the temperature control apparatus according to the practical example is provided with an optical part 100 including a light source 110, which is a temperature control target, and a temperature controller 200, which is configured as a main part of the temperature control apparatus.

The optical part 100 is provided with the light source 110, a thermistor 120, a Peltier element 130, and a heat absorbing/radiating plate 140. The light source 110 is configured, for example, as a semiconductor laser that applies light for measuring a flow volume and concentration of a fluid, or the like. A temperature of the light source 110 may be detected by the thermistor 120. The light source 110 is configured to give or receive heat quantity to or from the heat absorbing/radiating plate 140, via the Peltier element 130.

The temperature controller 200 is provided with a temperature detector 210, a CPU 220, a final target temperature setting device 230, a variable target temperature generator 240, a difference detector 250, and a drive controller 260. The temperature detector 210 is configured to output the temperature of the light source 110 detected by the thermistor 120, to the CPU 220 and the difference detector 250. The CPU 220 is configured to control a target temperature, on the basis of the temperature of the light source 110 detected by the temperature detector 210, and a target temperature obtained from the final target temperature setting device 230. The final target temperature setting device 230 is configured, for example, as a read-only memory (ROM) or the like, and is configured to store a target temperature of the light source 110. The CPU 220 is further configured to switch between on and off of the drive controller 260. The variable target temperature generator 240 is configured to change the target temperature in accordance with an instruction from the CPU 220. The variable target temperature generator 240 is also configured to output a current target temperature of a current time point, to the difference detector 250. The difference detector 250 is configured to output a difference between the temperature of the light source 110 inputted from the temperature detector 210 and the target temperature inputted from the variable target temperature generator 240, to the drive controller 260. The drive controller 260 is configured to control the drive of the Peltier element 130, on the basis of the temperature difference inputted from the difference detector 250.

According to the temperature control apparatus in the practical example explained above, the drive of the Peltier element 130 (i.e., the transfer of the heat quantity between the light source 110 and the heat absorbing/radiating plate 140) is controlled on the basis of the temperature of the light source 110 and the target temperature. It is thus possible to appropriately perform the heat absorption/radiation of the temperature of the light source 110.

<Explanation of Operations>

Figure 2:
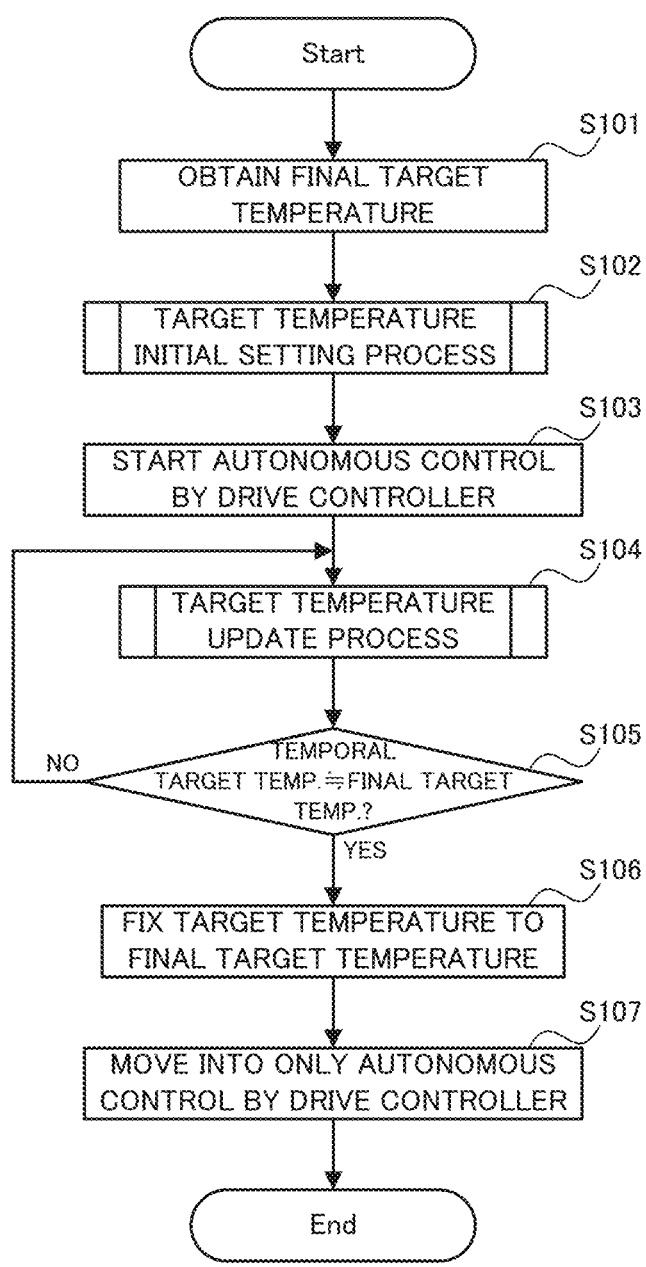
FIG. 2 is a flowchart illustrating a flow of operations of the temperature control apparatus according to the practical example.

Next, operations of the temperature control apparatus according to the practical example will be explained in detail with reference to FIG. 2. FIG. 2 is a flowchart illustrating a flow of the operations of the temperature control apparatus according to the practical example. Each step illustrated in FIG. 2 shall be performed by the CPU 220.

As illustrated in FIG. 2, in operation of the temperature control apparatus according to the practical example, a final target temperature of the light source 110 is firstly obtained from the final target temperature setting device 230 (step S101), and a target temperature initial setting process is performed (step S102).

Figure 3:
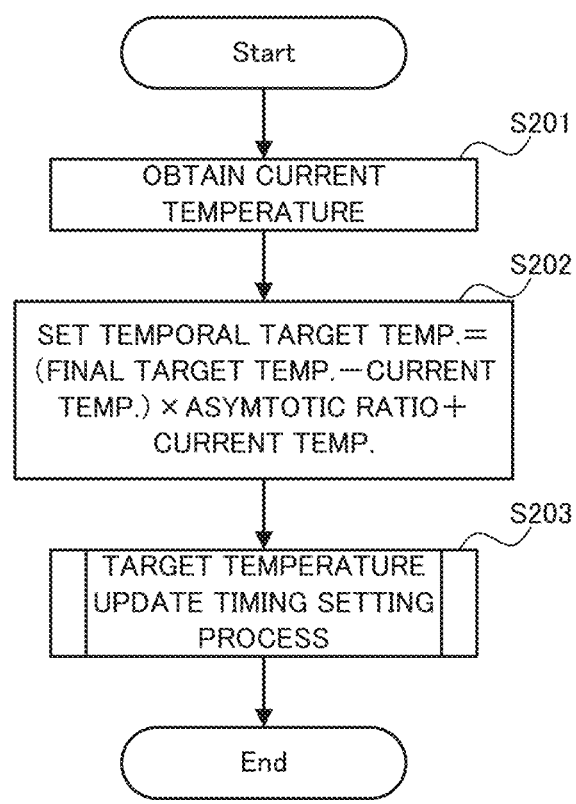
FIG. 3 is a flowchart illustrating a flow of a target temperature initial setting process.
Figure 4:
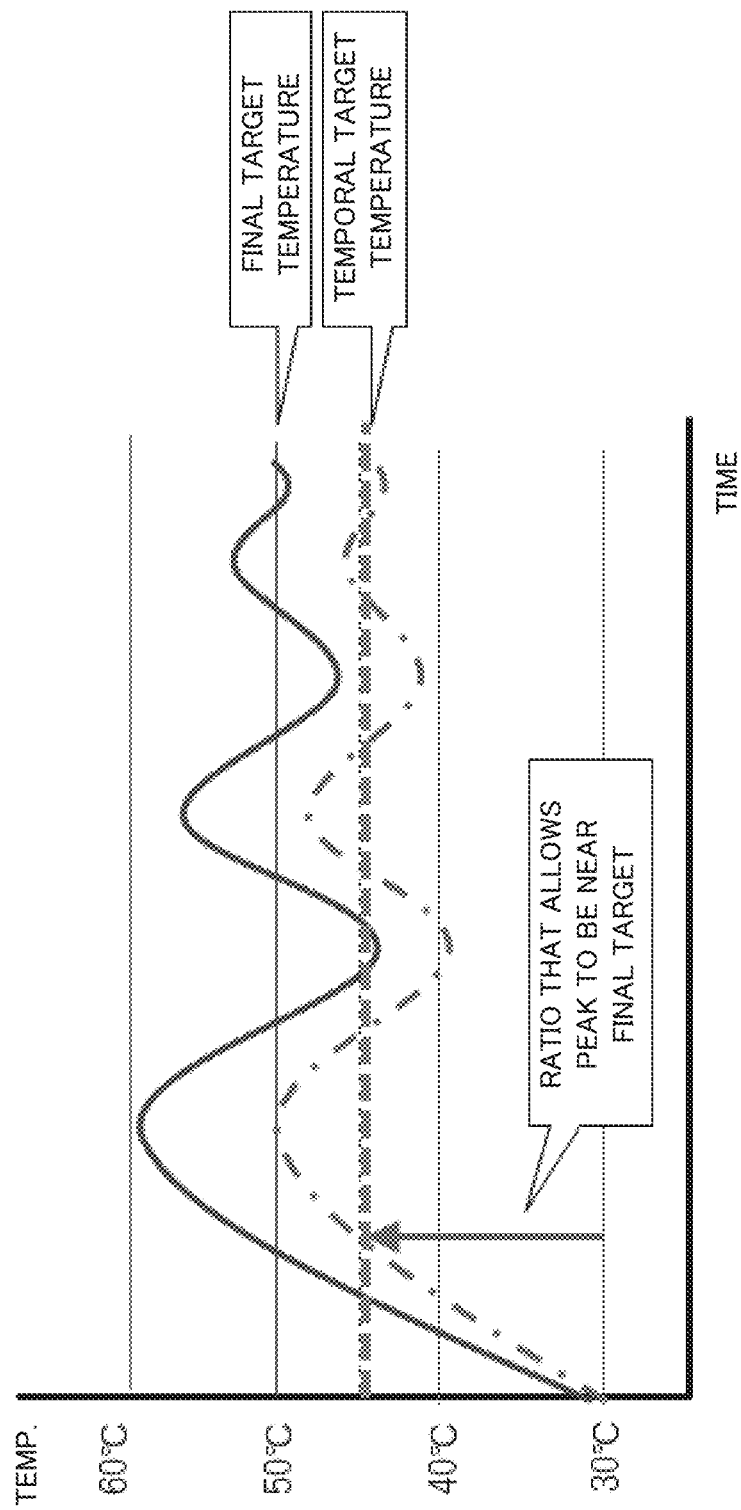
FIG. 4 is a conceptual diagram illustrating an example of a method of calculating a temporal target temperature.

Now, the target temperature initial setting process will be explained in detail with reference to FIG. 3 and FIG. 4. FIG. 3 is a flowchart illustrating a flow of the target temperature initial setting process. FIG. 4 is a conceptual diagram illustrating an example of a method of calculating a temporal target temperature.

As illustrated in FIG. 3, when the target temperature initial setting process is started, the current temperature of the light source 110 detected by the thermistor 120 is firstly obtained via the temperature detector 210 (step S201). Then, a temporal target temperature is set on the basis of the obtained current temperature of the light source 110 and the already obtained final target temperature (step S202). Specifically, the temporal target temperature is calculated by the following equation (1).

$$\text{Temporal Target Temperature} = (\text{Final Target Temperature} - \text{Current Temperature}) \times \text{Asymptotic Ratio} + \text{Current Temperature} \quad (1)$$

As illustrated in FIG. 4, consider an example in which a peak of a temperature rise due to overshooting is 60 degrees C. when the current temperature is set to 30 degrees C. and the final target temperature is set to 50 degrees C.

In this case, a peak ratio can be obtained by the following equation (2).

$$\text{Peak Ratio} = (\text{Peak Temperature} - \text{Start Temperature}) / (\text{Target Temperature} - \text{Start Temperature}) \quad (2)$$

If the numerical values in the example above are substituted in the equation (2), the peak ratio=3/2. The asymptotic ratio is obtained as the inverse of the peak ratio, is thus 1/(3/2)=2/3. In other words, by using 2/3 as the asymptotic ratio of the equation (1), the temporal target temperature can be preferably calculated. Specifically, the temporal target temperature is (50 degrees C.−30 degrees C.)×2/3+30 degrees C.=43.3 degrees C.

Back in FIG. 3, after the temporal target temperature is set, a target temperature update timing setting process is performed (step S203). In the target temperature update timing setting process, the update timing of the target temperature, which is variable, is set.

Figure 5:
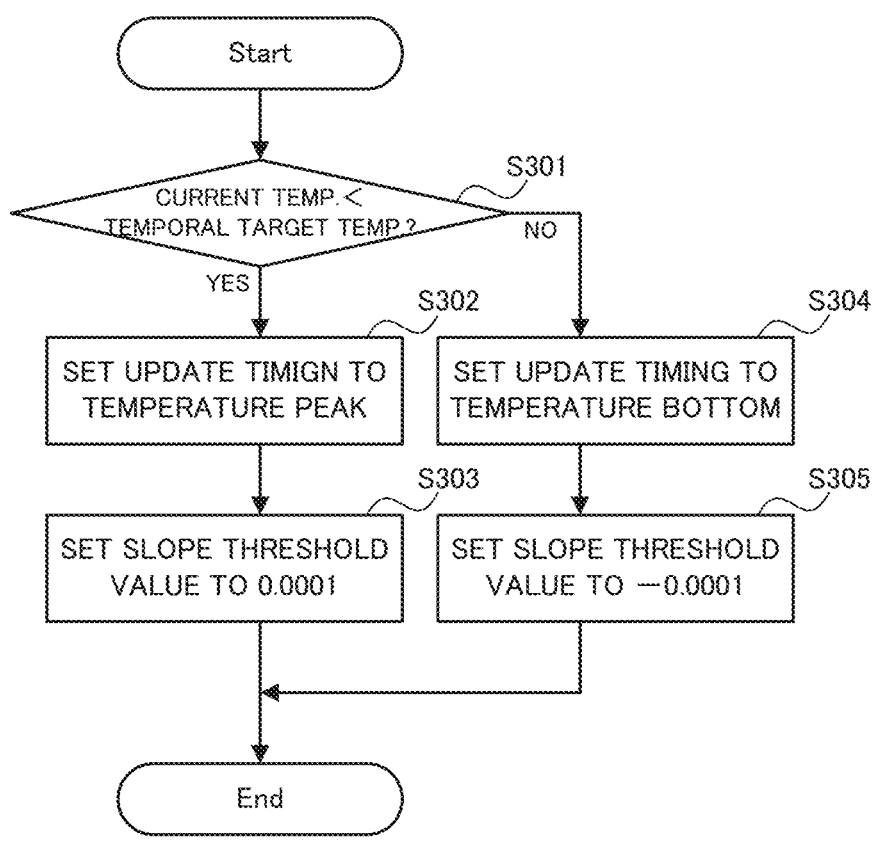
FIG. 5 is a flowchart illustrating a flow of a target temperature update timing process.

Now, the target temperature update timing setting process will be explained in detail with reference to FIG. 5. FIG. 5 is a flowchart illustrating a flow of the target temperature update timing process.

As illustrated in FIG. 5, when the target temperature update timing process is started, it is firstly determined whether or not the current temperature of the light source 110 is less than the temporal target temperature (step S301). If the current temperature is less than the temporal target temperature (the step S301: YES), the update timing is set to a temperature peak (step S302), and a slope threshold value is set to a positive numeral value that is extremely close to 0, which is, for example, 0.0001 (step S303). On the other hand, if the current temperature is greater than the temporal target temperature (the step S301: NO), the update timing is set to a temperature bottom (step S304), and the slope threshold value is set to a negative numeral value that is extremely close to 0, which is, for example, −0.0001 (step S305).

As described above, if the temperature of the light source 110 is less than the temporal target temperature and the temperature control is performed in a heating direction, then, the update timing of the target temperature is set to the temperature peak, and the positive numeral value that is extremely close to 0 is set as the slope threshold value for peak determination. On the other hand, if the temperature of the light source 110 is greater than the temporal target temperature and the temperature control is performed in a cooling direction, then, the update timing of the target temperature is set to the temperature bottom, and the negative numeral value that is extremely close to 0 is set as the slope threshold value for determining the bottom.

Back in FIG. 2, when the aforementioned target temperature initial setting process is ended, the drive controller 260 is turned on, and an autonomous control (i.e., the control of the Peltier element 130 to bring the temperature of the light source 110 close to the target temperature) is started (step S103). During implementation of the autonomous control by the drive controller 260, a target temperature update process is performed (step S104).

Figure 6:
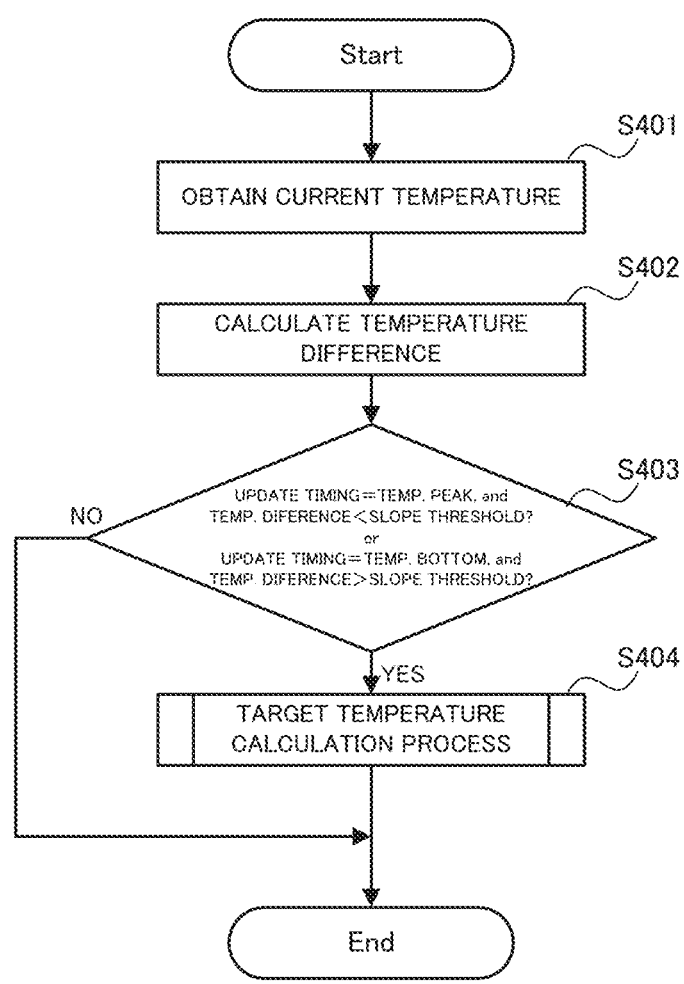
FIG. 6 is a flowchart illustrating a flow of a target temperature update process.

Now, the target temperature update process will be explained in detail with reference to FIG. 6. FIG. 6 is a flowchart illustrating a flow of the target temperature update process.

As illustrated in FIG. 6, when the target temperature update process is started, the current temperature of the light source 110 is firstly obtained (step S401). Then, a difference between the current temperature of the light source 110 currently obtained and the temperature of the light source 110 previously obtained (i.e., a temperature change amount of the light source 110) is calculated (step S402).

If the update timing is set to the temperature peak in the target temperature update timing setting process, it is then determined whether or not the temperature difference is less than the slope threshold value (step S403). On the other hand, if the update timing is set to the temperature bottom in the target temperature update timing setting process, it is determined whether or not the temperature difference is greater than the slope threshold value (step S403). In other words, here, it is determined whether or not it is the timing to update the target temperature.

If it is determined to be the timing to update the target temperature (the step S403: YES), a target temperature calculation process is performed (step S404). If it is determined not to be the timing to update the target temperature (the step S403: NO), the target temperature calculation process is not performed.

Figure 7:
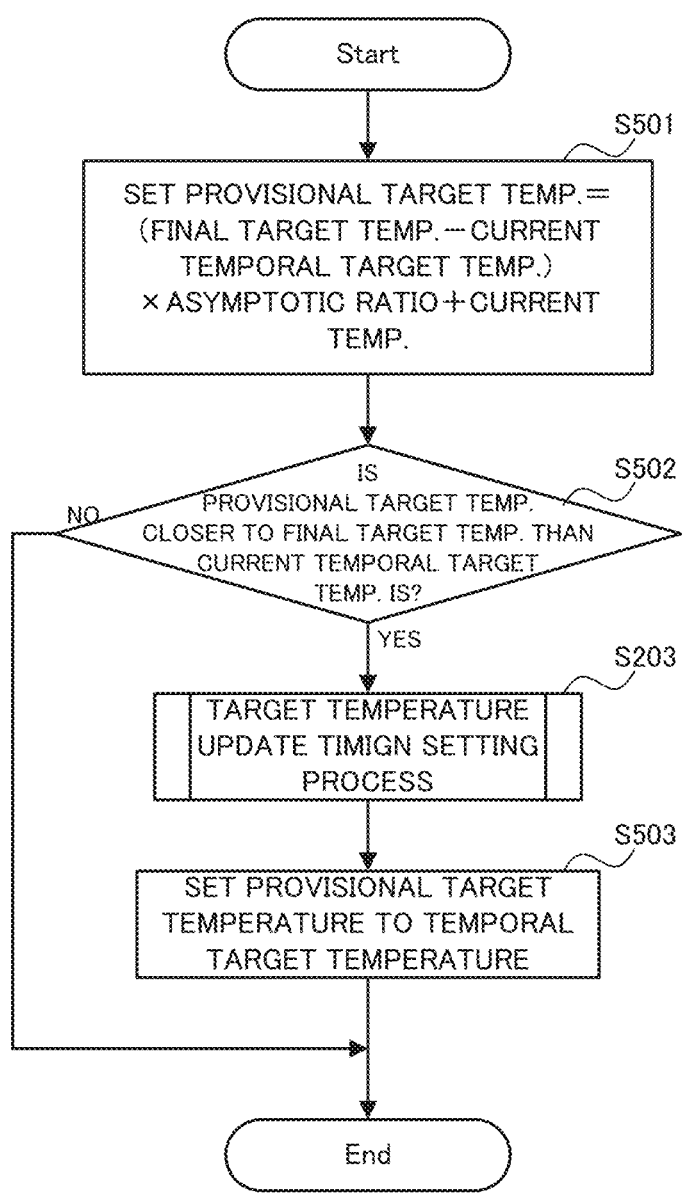
FIG. 7 is a flowchart illustrating a flow of a target temperature calculation process.

Now, the target temperature calculation process will be explained in detail with reference to FIG. 7. FIG. 7 is a flowchart illustrating a flow of the target temperature calculation process.

As illustrated in FIG. 7, when the target temperature calculation process is started, a provisional target temperature is set (step S501). Specifically, the provisional target temperature is calculated by using the following equation (3).

$$\text{Provisional Target Temperature}=(\text{Final Target Temperature}-\text{Current Temporal Target Temperature})\times\text{Asymptotic Ratio}+\text{Current Temperature} \quad (3)$$

After the provisional target temperature is set, it is determined whether or not the provisional target temperature is closer to the final target temperature than the current temporal target temperature is (step S502). If it is determined that the provisional target temperature is not closer to the final target temperature than the current temporal target temperature is (the step S502: NO), the temporal target temperature is not to be changed, and the subsequent process is not performed. On the other hand, if it is determined that the provisional target temperature is closer to the final target temperature than the current temporal target temperature is (the step S502: YES), the target temperature update timing setting process is performed (the step S203). In other words, the same process as the process already explained in FIG. 5 is performed.

After the update timing of the target temperature is set, the provisional target temperature is set as a new temporal target temperature (step S503). In other words, the temporal target temperature is changed.

Back in FIG. 2 again, after the target temperature update process is ended, it is determined whether or not the temporal target temperature is extremely close to the final target temperature (step S105). Specifically, it is determined whether or not a difference between the temporal target temperature and the final target temperature is less than or equal to a predetermined first threshold value. If it is determined that the temporal target temperature is not extremely close to the final target temperature (the step S105: NO), the target temperature update process is performed again.

On the other hand, if it is determined that the temporal target temperature is extremely close to the final target temperature (the step S105: YES), the target temperature is fixed to the final target temperature (step S106). In other words, regardless of the value of the temporal target temperature, the target temperature is forcibly set to the final target temperature. According to the process as described above, it is possible to avoid such a problem that the temperature of the light source 110 approaches the target temperature and the temperature change amount becomes small, due to which the temporal target temperature does not reach the final target temperature).

After the target temperature is fixed to the final target temperature, it is moved into only the autonomous control by the drive controller 260 (step S107), and a series of steps is ended.

<Specific Operation Examples>

Figure 8:
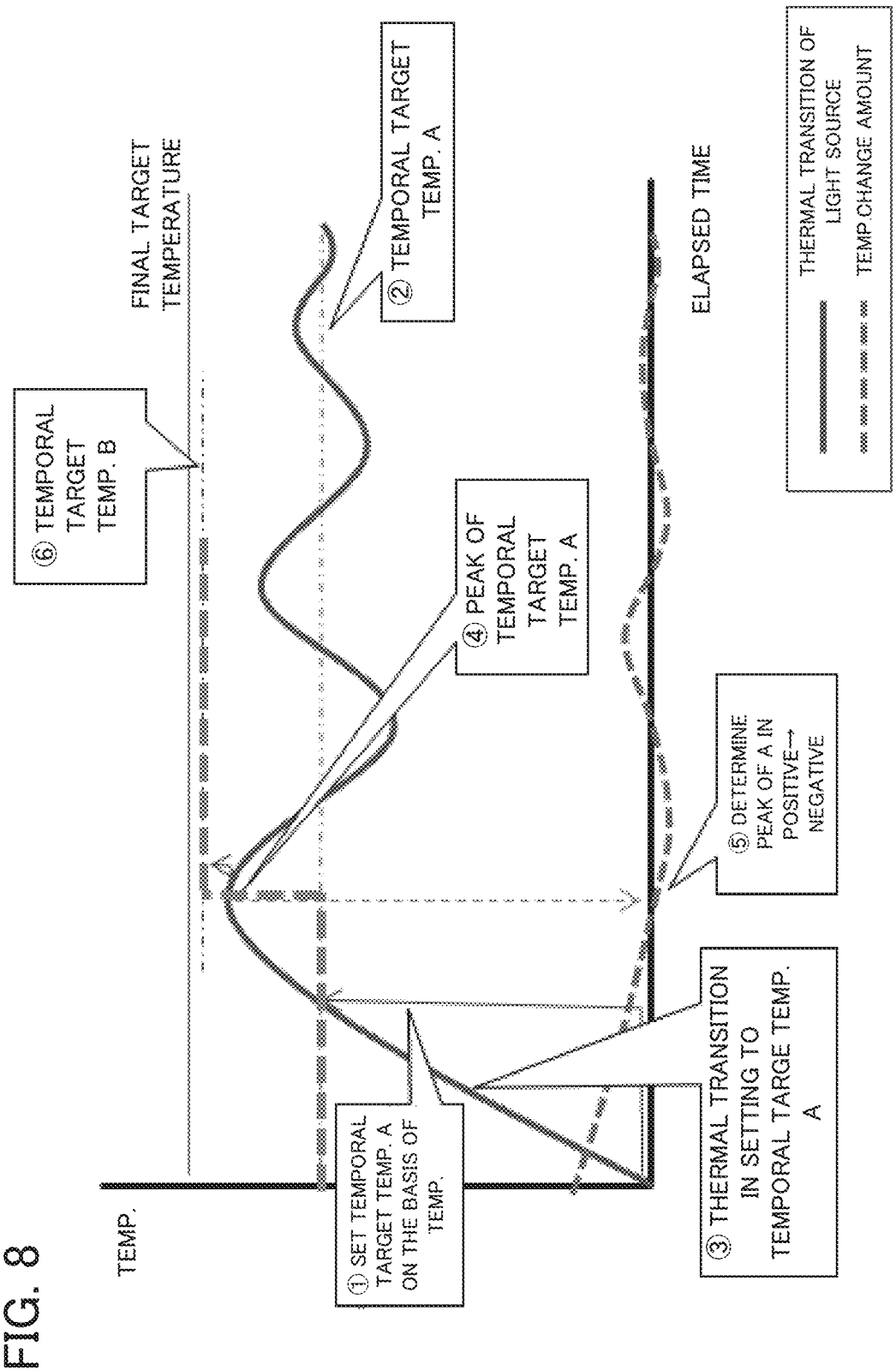
FIG. 8 is version 1 of a diagram illustrating an example of the operations of the temperature control apparatus according to the practical example.
Figure 11:
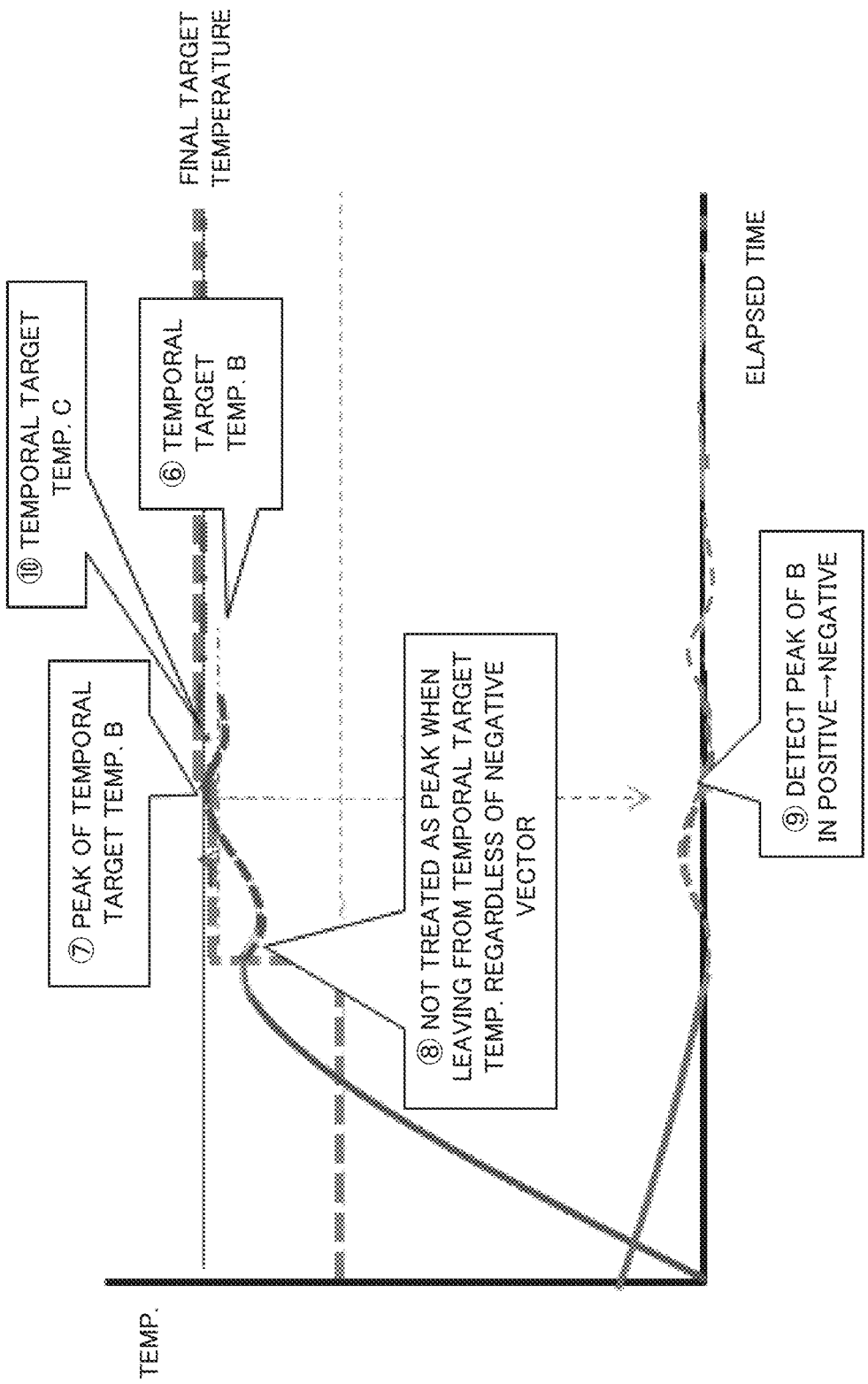
FIG. 11 is version 2 of a diagram illustrating an example of the operations of the temperature control apparatus according to the practical example.

Next, specific operation examples of the temperature control apparatus according to the practical example will be explained with reference to FIG. 8 and FIG. 11. FIG. 8 is version 1 of a diagram illustrating an example of the operations of the temperature control apparatus according to the practical example. FIG. 11 is version 2 of a diagram illustrating an example of the operations of the temperature control apparatus according to the practical example. The operation examples illustrated in FIG. 8 and FIG. 11 exemplify that the temperature of the light source 110 is less than the target temperature (i.e., the temperature control is performed by heating).

As illustrated in FIG. 8, when the operations of the temperature control apparatus according to the practical example is started, a temporal target temperature A is firstly set on the basis of the current temperature of the light source 110. The Peltier element 130 is then controlled so that the temperature of the light source 110 approaches the temporal target temperature A. Thus, the temperature of the light source 110 gradually increases to the temporal target temperature A.

The temperature of the light source 110 continues to increase due to overshooting even after reaching the temporal target temperature A. It is then determined that the temperature reaches a peak in timing in which a slope of the temperature change amount changes from a positive direction to a negative direction, and a new temporal target temperature B is set.

Figure 9:
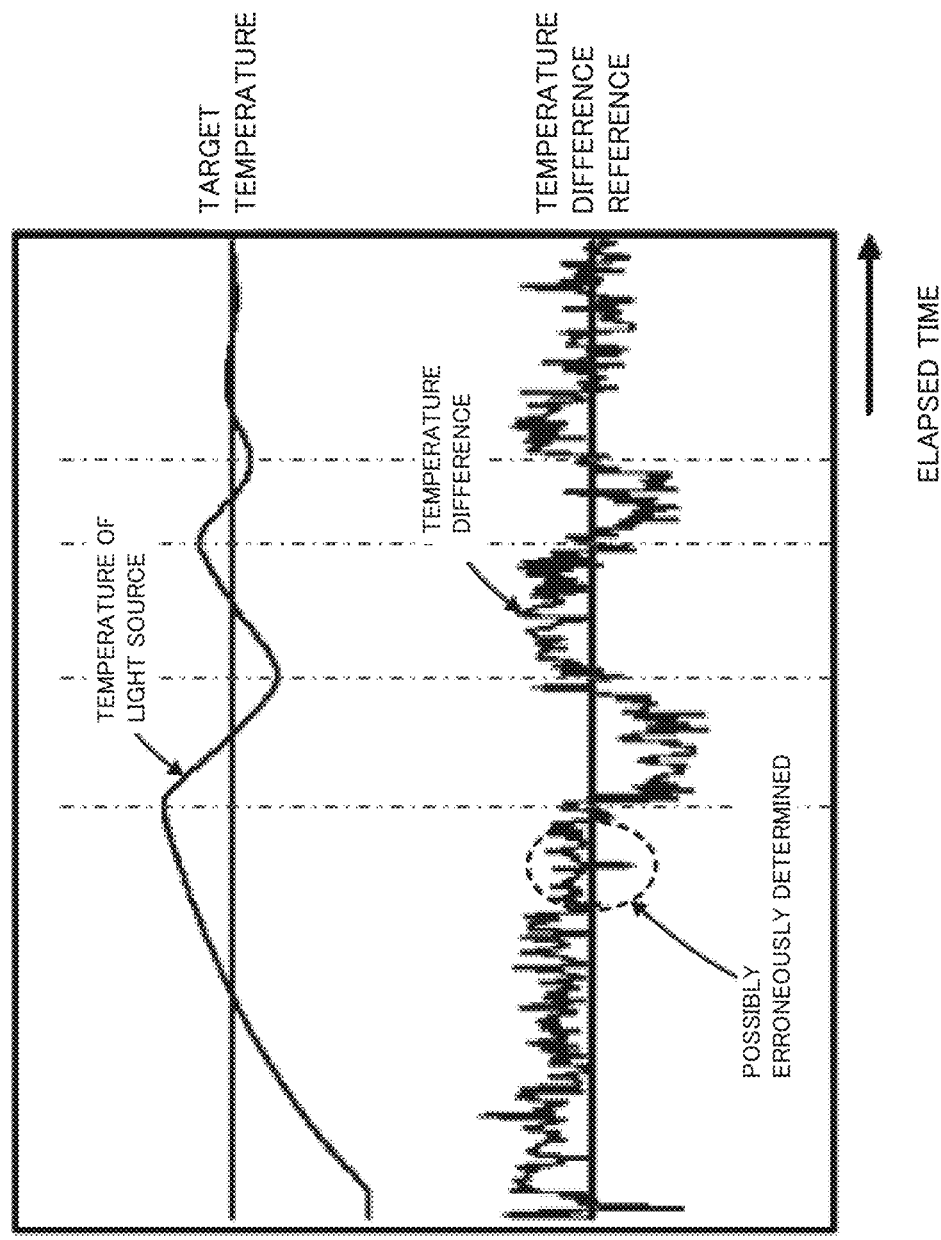
FIG. 9 is a diagram illustrating erroneous determination that can occur in peak determination.
Figure 10:
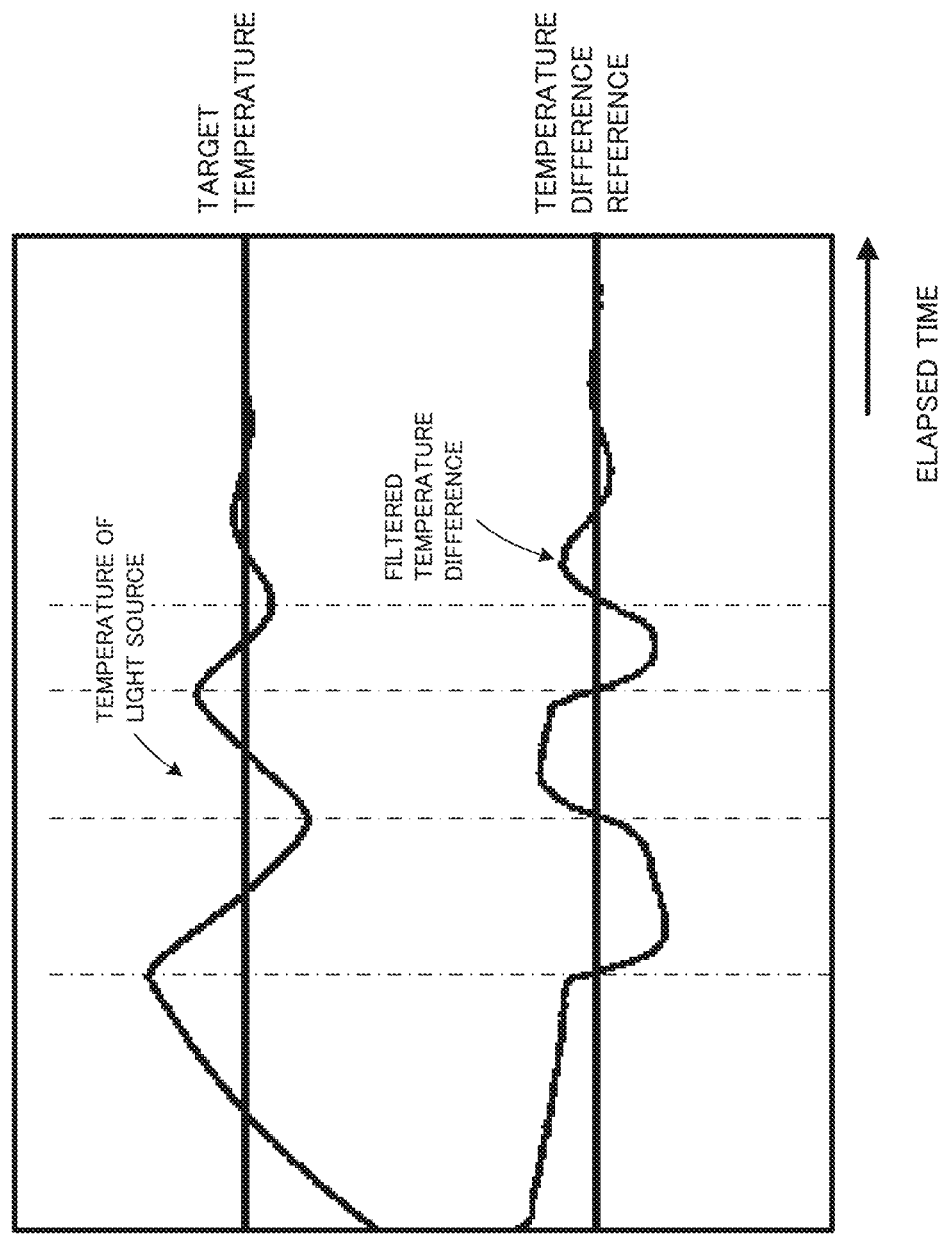
FIG. 10 is a diagram illustrating a filtering process in the peak determination.

Now, a method of determining the temperature peak will be specifically explained with reference to FIG. 9 and FIG. 10. FIG. 9 is a diagram illustrating erroneous determination that can occur in peak determination. FIG. 10 is a diagram illustrating a filtering process in the peak determination.

As illustrated in FIG. 9, a vector of a temperature waveform is confirmed by a difference from the previously detected temperature. Specifically, the timing in which the temperature difference crosses a temperature difference reference indicates a peak or a bottom.

This temperature difference is sampled at a relatively high frequency to accurately determine the timing of the peak. If the sampling frequency is high, however, the temperature difference is very small and is buried in noise, so that a trend is hardly seen. As a result, if the sampled temperature difference is used without a change, then, the temperature difference is temporarily negative in an area surrounded by a dashed line in FIG. 9. It is thus possibly erroneously determined to be a peak even though it is actually not.

As illustrated in FIG. 10, in the practical example, so as to avoid the detrimental effect described above, the temperature difference is filtered to be used. In this manner, a noise component is removed from the temperature difference, and it is possible to preferably prevent the erroneous determination of the peak and the bottom described above.

Then, as illustrated in FIG. 11, the temperature of the light source 110 is controlled to increase to the new temporal target temperature B. It is then determined whether or not the temperature of the light source 110 reaches a peak again. After the target temperature is changed to the temporal target temperature B, the positive/negative sign of the temperature difference is reversed (i.e., a bottom is detected) in a portion in which the temperature of the light source 110 is changed from decreasing to increasing, but the temporal target temperature is not changed in the timing of the bottom in a heating control. The temporal target temperature B is changed to a new temporal target temperature C, in timing in which the slope of the temperature difference changes from a positive direction to a negative direction.

As described above, the temporal target temperature is changed to gradually approach the final target temperature. At a time point at which the difference between the temporal target temperature and the final target temperature is less than or equal to the first threshold value (in other words, in timing in which the temporal target temperature is in a predetermined pull-in range), the target temperature is pulled into and fixed at the final target temperature.

Figure 12:
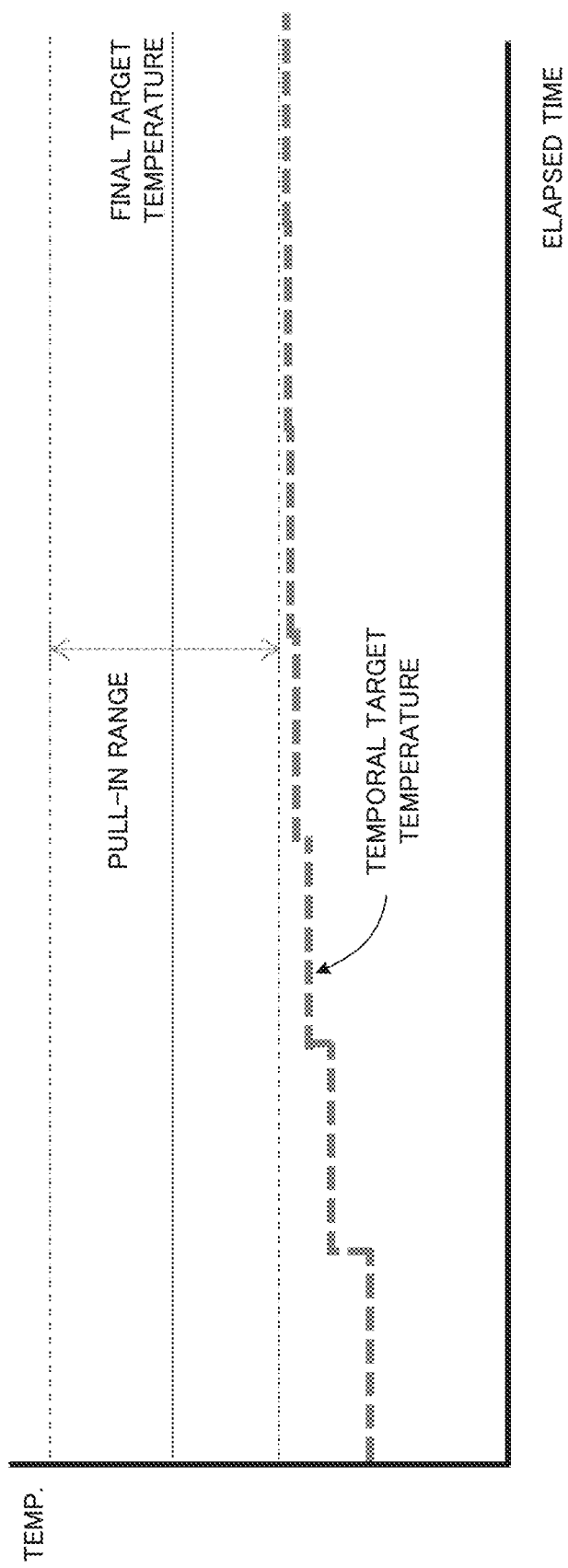
FIG. 12 is a diagram illustrating an example in which the temporal target temperature asymptotically comes close to a line outside a pull-in range.
Figure 13:
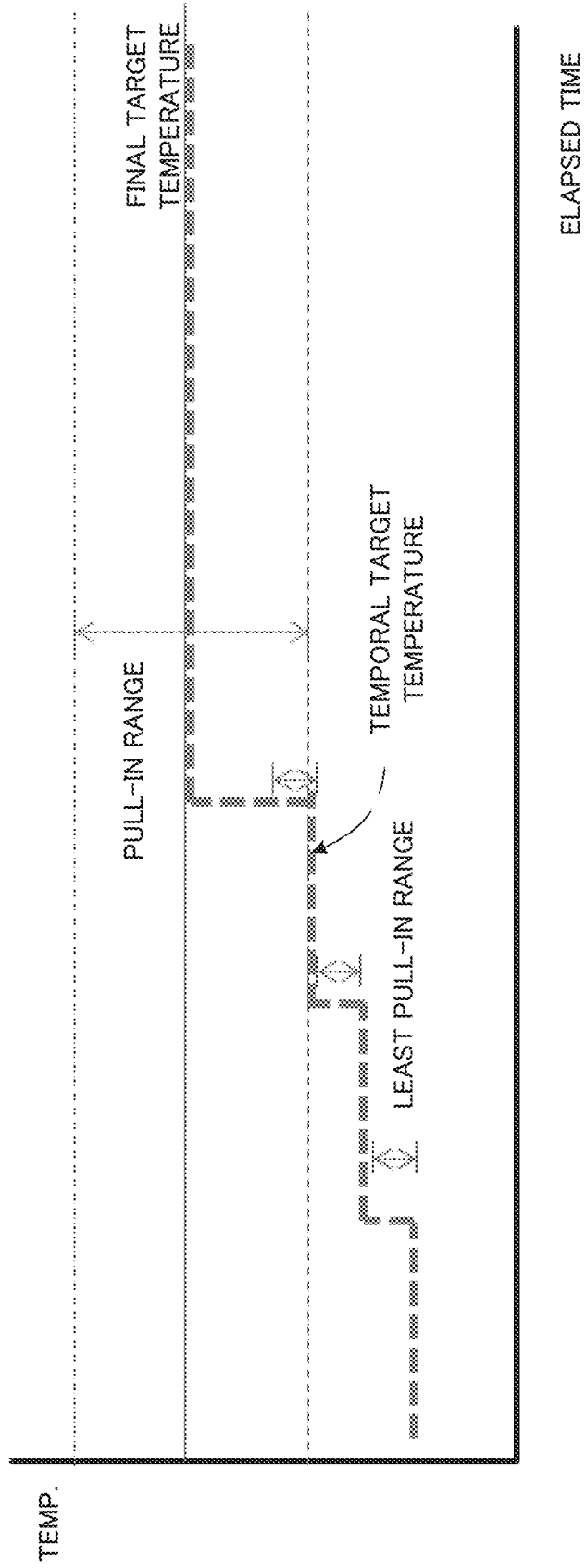
FIG. 13 is a diagram illustrating variation in the temporal target temperature when a least pull-in range is set.

Now, a least pull-in range of the temporal target temperature will be explained in detail with reference to FIG. 12 and FIG. 13. FIG. 12 is a diagram illustrating an example in which the temporal target temperature asymptotically comes close to a line outside the pull-in range. FIG. 13 is a diagram illustrating variation in the temporal target temperature when the least pull-in range is set.

As illustrated in FIG. 12, even when the pull-in range is set, the temporal target temperature asymptotically comes close to a line outside the pull-in range depending on a condition, and is thus not pull into the final target temperature in some cases. In this case, the temporal target temperature is not changed to the final target temperature, and thus, the temperature of the light source 110 does not readily reach the final target temperature.

As illustrated in FIG. 13, in the practical example, so as to avoid the detrimental effect described above, the least pull-in range of the temporal target temperature is set. By this, when the temporal target temperature is updated, the value of the temporal target temperature changes at least by a least pull-in unit. In other words, the temporal target temperature varies with a granularity of the least pull-in unit or more. As a result, a slight change in the temporal target temperature is suppressed, and the situation in which the temporal target temperature asymptotically comes close to a line outside the pull-in range, as illustrated in FIG. 12, can be avoided. Therefore, the temperature of the light source 110 is allowed to reach the final target temperature.

Figure 14:
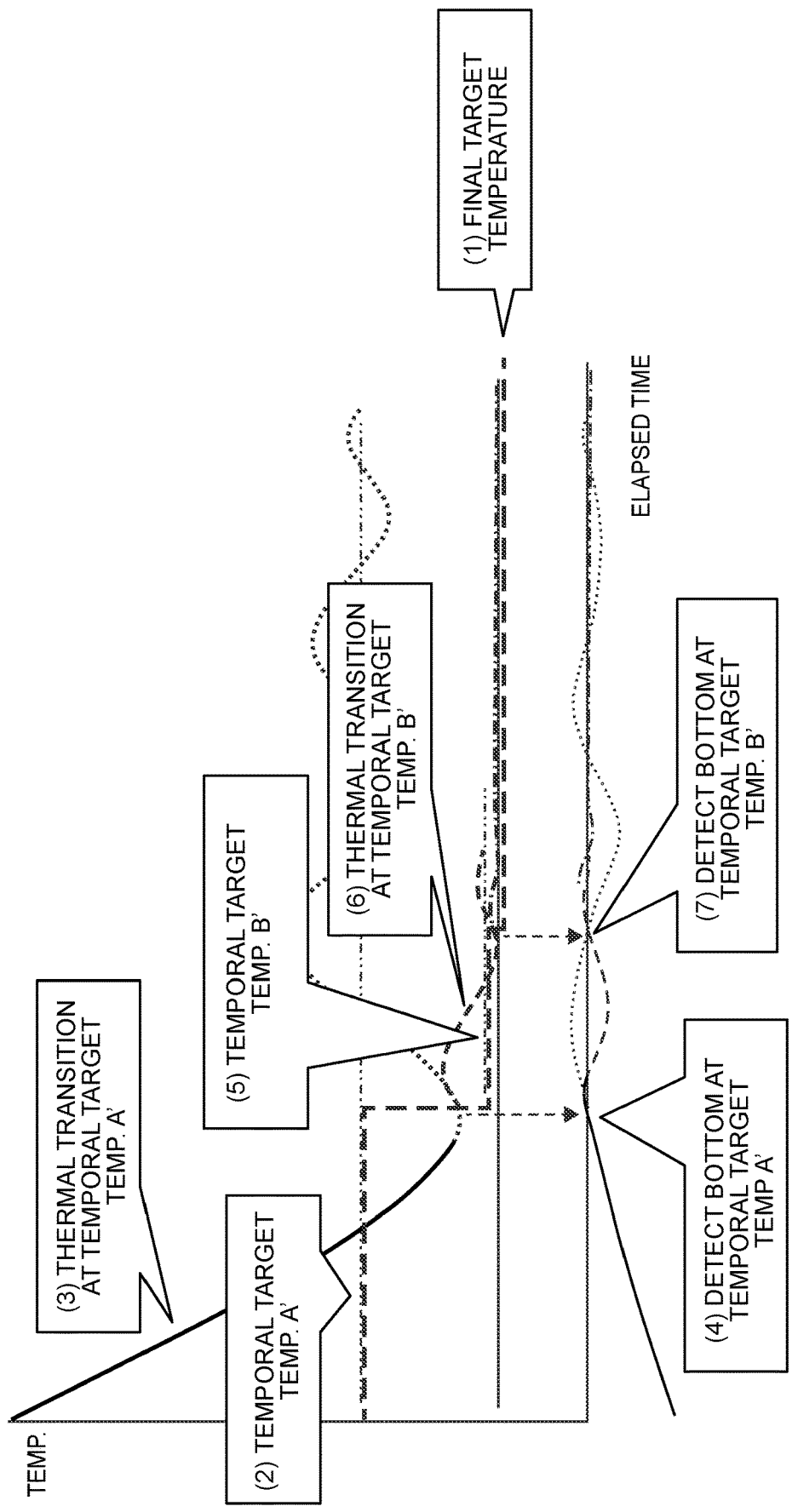
FIG. 14 is a diagram illustrating an example of operations in cooling of the temperature control apparatus according to the practical example.

An explanation was given to the operations when the light source 110 is heated in the aforementioned practical example; however, the same operations are performed even in cooling. Hereinafter, the operations in cooling of the temperature control apparatus according to the practical example will be explained with reference to FIG. 14. FIG. 14 is a diagram illustrating an example of the operations in cooling of the temperature control apparatus according to the practical example.

As illustrated in FIG. 14, in cooling the light source 110, a temporal target temperature A' is firstly set on the basis of the current temperature of the light source 110. The Peltier element 130 is then controlled so that the temperature of the light source 110 approaches the temporal target temperature A'. Thus, the temperature of the light source 110 gradually decreases to the temporal target temperature A'.

The temperature of the light source 110 continues to decrease due to undershooting even after reaching the temporal target temperature A'. It is then determined that the temperature reaches a bottom in timing in which the temperature change amount changes from negative to positive, and a new temporal target temperature B' is set. Then, the determination of the bottom is started again, and the temporal target temperature is gradually updated to a value that is close to the final target temperature.

<Effect of Embodiment>

Figure 15:
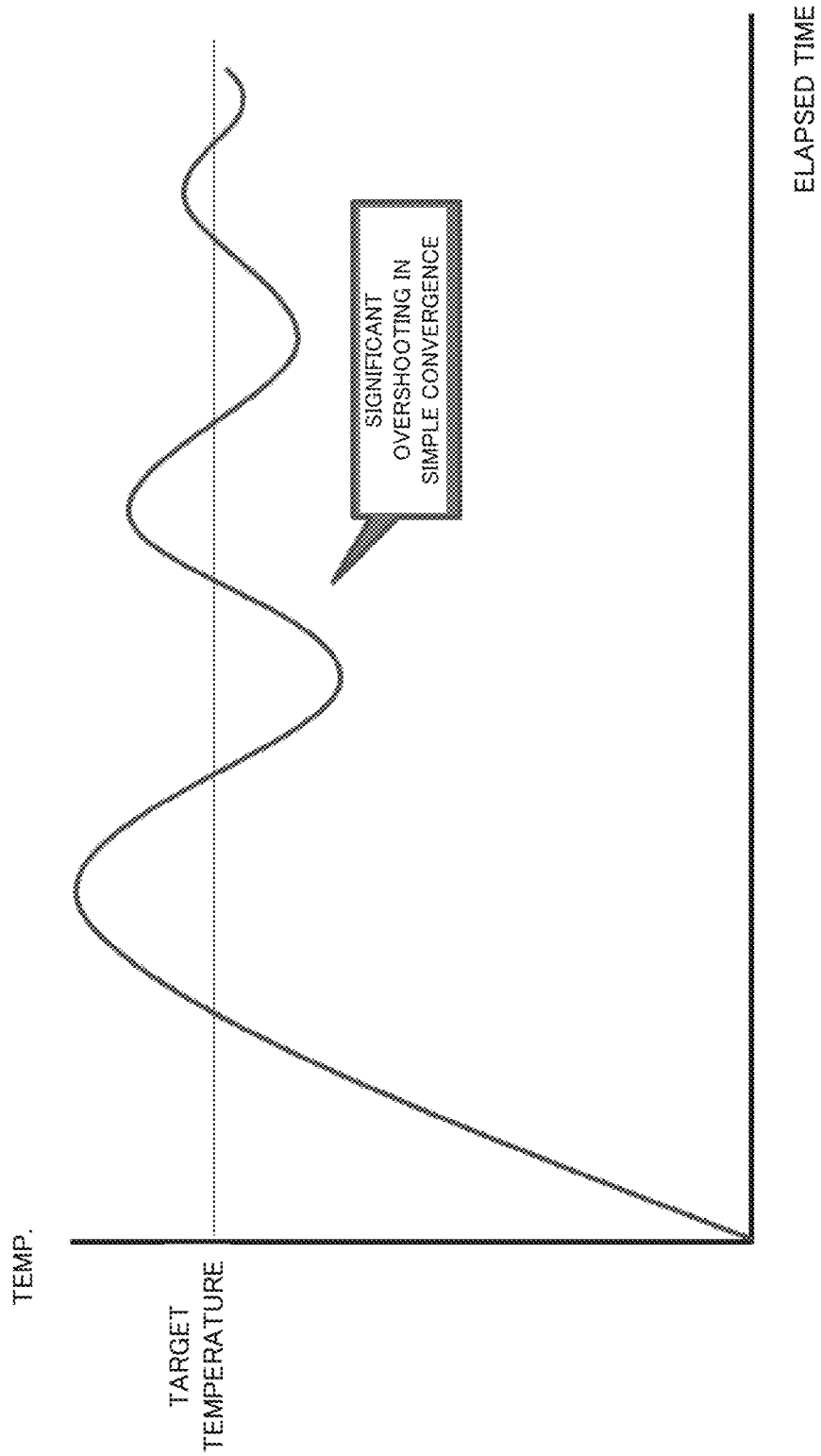
FIG. 15 is a diagram illustrating an example of operations of a temperature control apparatus according to a first comparative example.
Figure 16:
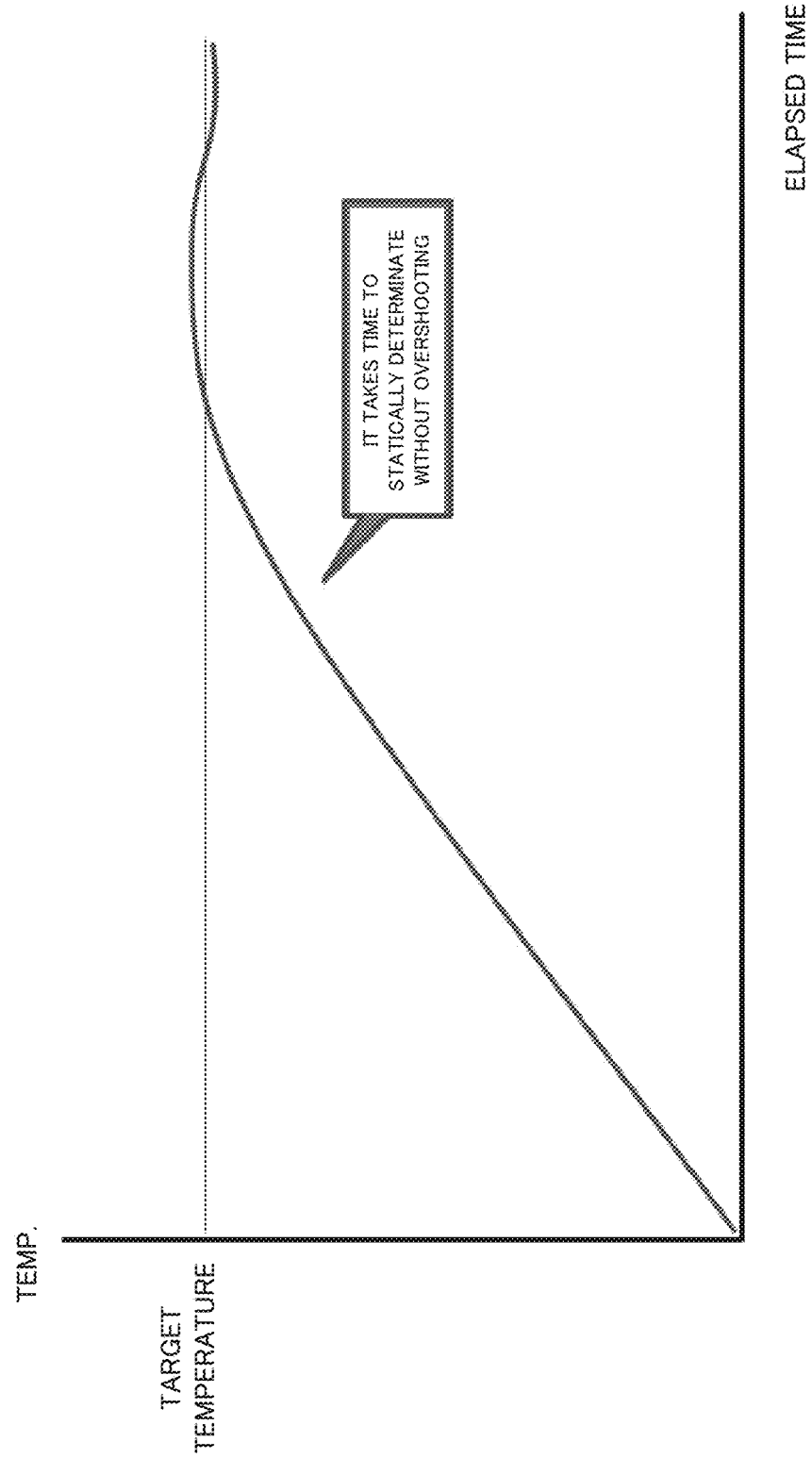
FIG. 16 is a diagram illustrating an example of operations of a temperature control apparatus according to a second comparative example.
Figure 17:
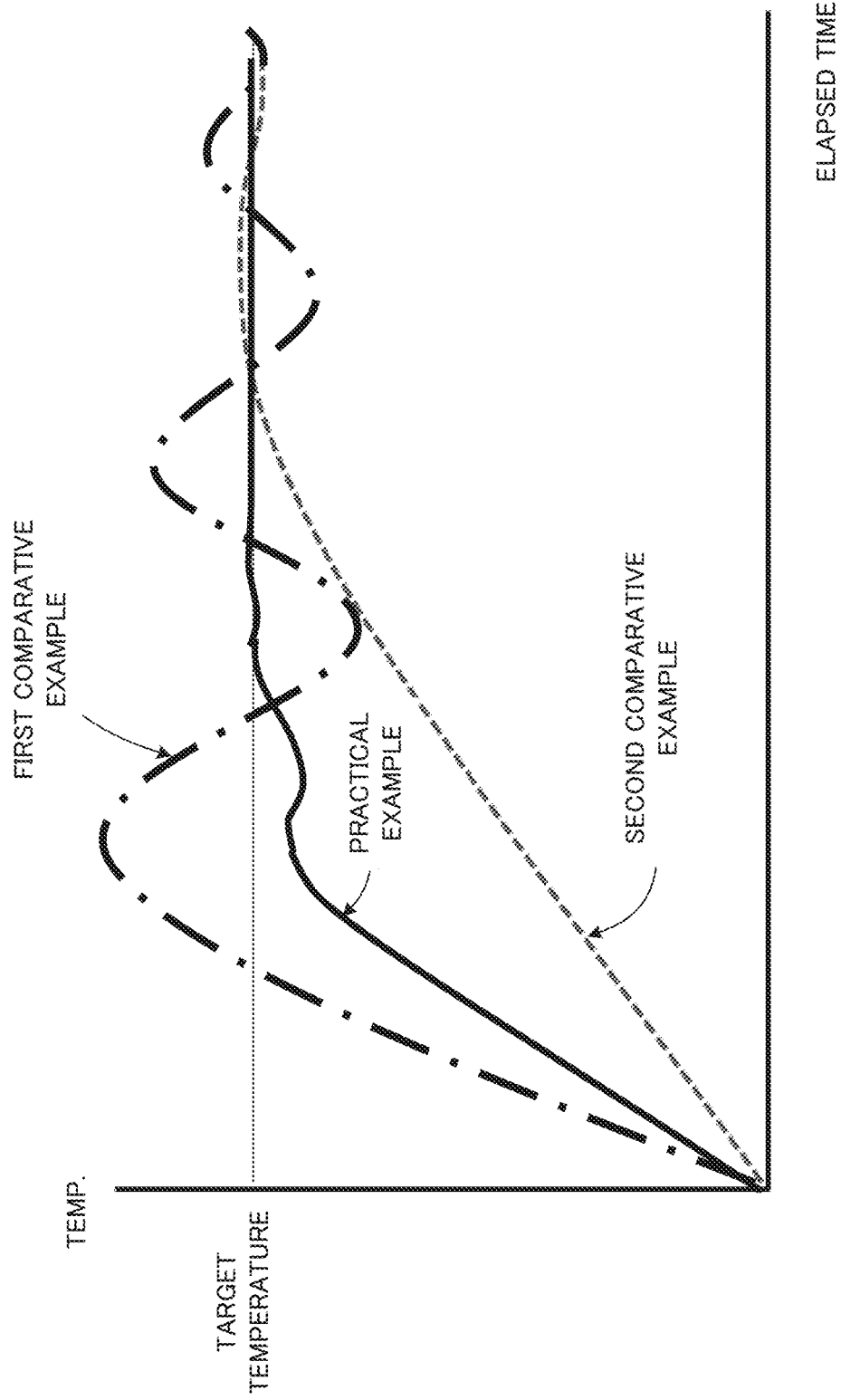
FIG. 17 is a diagram illustrating a difference between the practical example and the first and second comparative examples.

Next, a technical effect obtained by the temperature control apparatus according to the practical example will be explained with reference to FIG. 15 to FIG. 17. FIG. 15 is a diagram illustrating an example of operations of a temperature control apparatus according to a first comparative example. FIG. 16 is a diagram illustrating an example of operations of a temperature control apparatus according to a second comparative example. FIG. 17 is a diagram illustrating a difference between the practical example and the first and second comparative examples.

As illustrated in FIG. 15, the temperature control apparatus according to the first comparative example does not allow the target temperature to be variable (i.e., the target temperature is fixed to the final target temperature from the beginning). Thus, there is significant overshooting, and the temperature of the light source 110 repeats increasing and decreasing, significantly, around the target temperature. As a result, it takes a relatively long time to converge on the target temperature.

As illustrated in FIG. 16, in the second comparative example, a heating/cooling speed is set to be less than that in the first comparative example. In this case, although the overshooting can be suppressed, the temperature change of the light source 110 also becomes slow. As a result, it takes a relatively long time to converge on the target temperature.

As illustrated in FIG. 17, on the temperature control apparatus according to the practical example, as explained above, the target temperature is set to be variable, and the target temperature is updated in appropriate timing. Thus, even if the overshooting occurs for the temporal target temperature, the overshooting for the final target temperature does not occur. Thus, the temperature of the light source 110 is controlled without any influence of the overshooting (in other words, by making good use of the overshooting for the temporal target temperature). Therefore, as is clear from the drawing, it is possible to stabilize the temperature of the light source 110 at the target temperature at an extremely early stage, in comparison with the first and second comparative examples.

<Modified Example>

Figure 18:
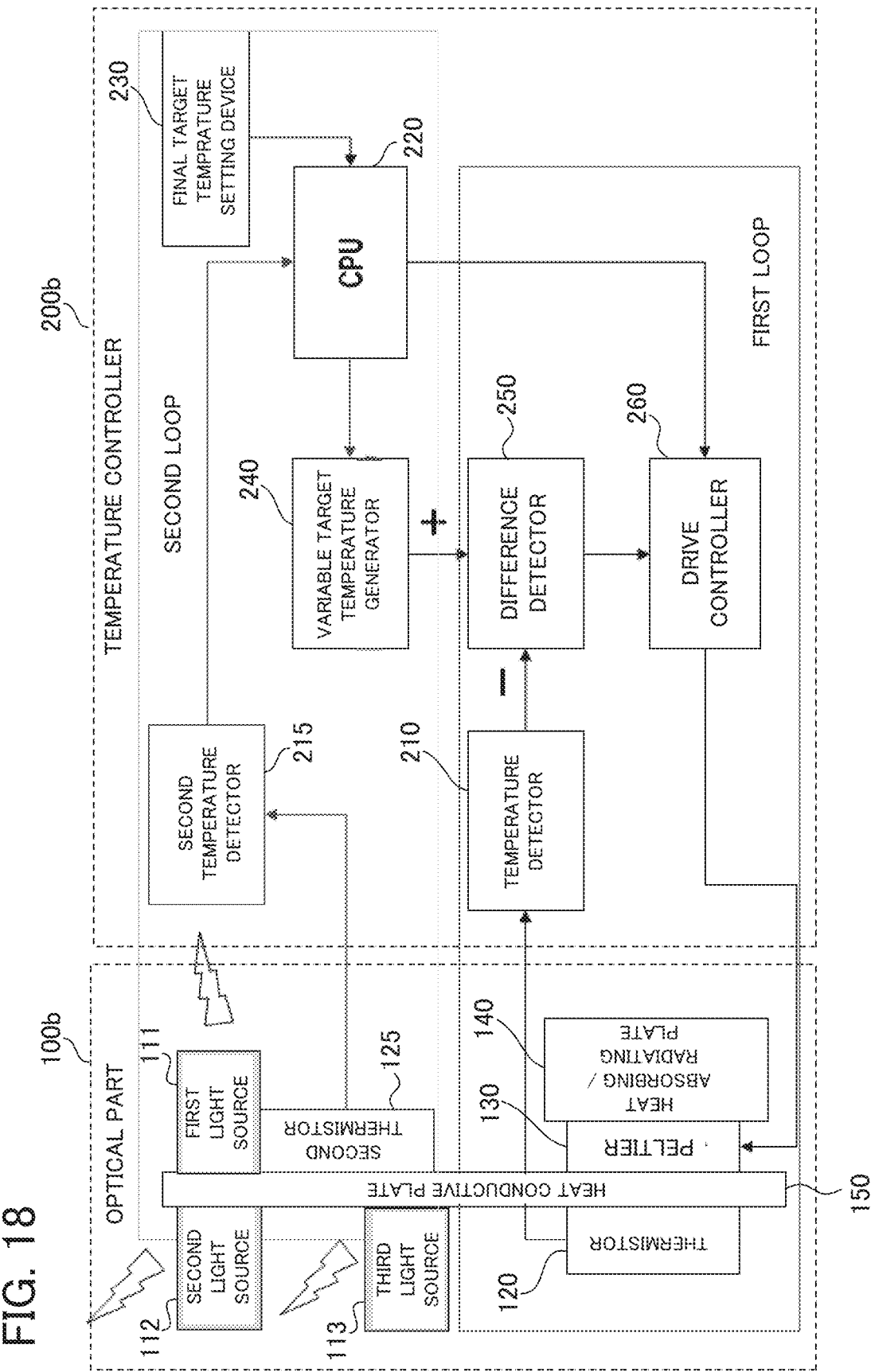
FIG. 18 is a block diagram illustrating a configuration of a temperature control apparatus according to a modified example.

Next, a temperature control apparatus according to a modified example will be explained with reference to FIG. 18. FIG. 18 is a block diagram illustrating a configuration of the temperature control apparatus according to the modified example.

The temperature control apparatus according to the modified example explained blow is partially different in configuration from the temperature control apparatus according to the practical example described above, and has substantially the same other configuration and operations. Thus, hereinafter, a different part from the practical example described above will be explained in detail, and an explanation of the same part will be omitted.

As illustrated in FIG. 18, an optical part 100b according to the modified example is a plurality of light sources 110. Specifically, the optical part 110b is provided with a first light source 111, a second light source 112, and a third light source 113, and each light source is thermally connected to the Peltier element 130 via a heat conductive plate 150. In addition to the thermistor 120 configured to detect the temperature around the Peltier element 130, a second thermistor 125 is placed to detect the temperature around the first light source 111, which is a temperature control target. The optical part 100b is configured as described above because there are such layout restrictions that the Peltier element 130 cannot be placed near the first light source 111. The first light source 111 is configured to give or receive heat quantity to or from the Peltier element 130 via the heat conductive plate 150, in which case, a thermal delay occurs in the heat conductive plate 150. Thus, a temperature controller 200b according to the modified example is configured to control the temperature of the first light source 111 by using two negative feedback loops, as described in detail below.

The temperature controller 200b is provided with a second temperature detector 215, in addition to the configuration of the practical example described above (refer to FIG. 1). By this, in addition to a first loop, which includes the Peltier element 130, the temperature detector 210, the difference detector 250, and the drive controller 260, a second loop, which includes the second temperature detector 215, the CPU 220, and the variable target temperature generator 240 is formed.

In a multiple loop temperature control using the first loop and the second loop, a temperature convergence control is autonomously performed in each loop. Thus, even the optical part 100b having the layout restrictions preferably allows the temperature of the light source 111 to converge on the target temperature. The multiple loop temperature control does not have a strong direct relation with a technical effect associated with the modified example, and a detailed explanation thereof is thus omitted.

In the configuration of the modified example described above, it is necessary to provide the heat conductive plate 150, and thus, there is a significant thermal delay between the thermistor 120 and the second thermistor 125. In this case, it takes a time for the temperature convergence in view of the entire apparatus in the temperature control, which may cause such a problem that excessive overshooting easily occurs.

Even in the modified example, however, by setting the target temperature to be variable, the temperature control can be performed without any influence of the overshooting. The technical effect of the temperature control that allows the target temperature to be variable is remarkably exhibited in a situation in which there is a significant thermal delay and the overshooting easily occurs, as in the modified example.

The present invention is not limited to the aforementioned embodiments and examples, but various changes may be made, if desired, without departing from the essence or spirit of the invention which can be read from the claims and the entire specification. A temperature control apparatus, a temperature control method, a computer program, and a recording medium that involve such changes are also intended to be within the technical scope of the present invention.

Description of Reference Numerals and Letters 100 optical part
110 light source
120 thermistor
130 Peltier element
140 heat absorbing/radiating plate
200 temperature controller
210 temperature detector
220 CPU
230 final target temperature setting device
240 variable target temperature generator
250 difference detector
260 drive controller

The invention claimed is:

1. A temperature control apparatus comprising:
a heat absorber or a heat radiator that heats or cools a temperature control target;
a first temperature detector that detects a first temperature around the heat absorber or the heat radiator;
a second temperature detector that detects a second temperature around the temperature control target;
a controller that controls said heat absorber or the heat radiator based on a variable target temperature; and
a variable temperature setter that
sets the variable target temperature to a first variable target temperature based on the first temperature, the second temperature, and target temperature information indicating a target temperature for the temperature control target,
sets the variable target temperature to a second variable target temperature that is closer to the target temperature than the first variable target temperature, when the first temperature or the second temperature reaches a peak in timing in which a slope of a change in the first temperature or the second temperature changes from a positive direction to a negative direction or to a bottom in timing in which the slope of the change in the first temperature or the second temperature changes from a negative direction to a positive direction, after the variable target temperature is set to the first variable target temperature, and
sets the variable target temperature to the target temperature when a difference between the target temperature and the second variable target temperature is less than or equal to a first predetermined value, after the variable target temperature is set to the second variable target temperature,
wherein the variable temperature setter and the controller are implemented by a computer.

2. The temperature control apparatus according to claim 1, wherein the target temperature is a temperature that allows formation of a peak of overshooting or a bottom of undershooting for the first variable target temperature.

3. The temperature control apparatus according to claim 1, wherein said variable temperature setter, during the setting of the variable target temperature is set to the second variable target temperature, further
(i) detects a change to the peak, based on a change in the first temperature being less than or equal to a second predetermined value, during heating, and
(ii) detects a change to the bottom, based on the change in the first temperature being greater than or equal to the second predetermined value, during cooling.

4. The temperature control apparatus according to claim 2, wherein said variable temperature setter further sets the variable target temperature using an asymptotic ratio that is an inverse of a peak ratio, and
the peak ratio is defined as a ratio of (i) a difference between a temperature that allows formation of the peak or the bottom for the first variable target temperature of the first temperature and an initial temperature, which is a temperature before the heat absorber or the heat radiator is controlled, and (ii) a difference between the target temperature and the initial temperature.

5. The temperature control apparatus according to claim 1, wherein said variable temperature setter repeatedly sets the variable target temperature to the first variable target temperature and to the second variable target temperature so that the variable target temperature is set to gradually approach the target temperature before the variable target temperature is set to the target temperature.

6. The temperature control apparatus according to claim 1, wherein said variable temperature setter further brings the variable target temperature close to the target temperature before the variable target temperature is set to the target temperature by varying the variable target temperature by a least pull-in unit that is outside of a set pull-in range of the target temperature.

7. A temperature control method using a temperature control apparatus including a heat absorber or a heat radiator that heats or cools a temperature control target, said temperature control method comprising:
detecting a first temperature around the heat absorber or the heat radiator;
detecting a second temperature around the temperature control target;
controlling said heat absorber or the heat radiator based on a variable target temperature;
setting the variable target temperature to a first variable target temperature based on the first temperature, the second temperature, and target temperature information indicating a target temperature for the temperature control target;
setting the variable target temperature to a second variable target temperature that is closer to the target temperature than the first variable target temperature, when the first temperature or the second temperature reaches a peak in timing in which a slope of a change in the first temperature or the second temperature changes from a positive direction to a negative direction or to a bottom in timing in which the slope of the change in the first temperature or the second temperature changes from a negative direction to a positive direction, after the variable target temperature is set to the first variable target temperature; and
setting the variable target temperature to the target temperature when a difference between the target temperature and the second variable target temperature is less than or equal to a first predetermined value, after the variable target temperature is set to the second variable target temperature.

8. A non-transitory computer readable recording medium on which is stored a computer program used for a temperature control apparatus including a heat absorber or a heat radiator that heats or cools a temperature control target, said computer program that causes the temperature control apparatus to perform a method comprising:
detecting a first temperature around the heat absorber or the heat radiator;
detecting a second temperature around the temperature control target;
controlling said heat absorber or the heat radiator based on a variable target temperature;
setting the variable target temperature to a first variable target temperature based on the first temperature, the second temperature, and target temperature information indicating a target temperature for the temperature control target;
setting the variable target temperature to a second variable target temperature that is closer to the target temperature than the first variable target temperature, when the first temperature or the second temperature reaches a peak in timing in which a slope of a change in the first temperature or the second temperature changes from a positive direction to a negative direction or to a bottom in timing in which the slope of the change in the first temperature or the second temperature changes from a negative direction to a positive direction, after the variable target temperature is set to the first variable target temperature; and setting the variable target temperature to the target temperature when a difference between the target temperature and the second variable target temperature is less than or equal to a first predetermined value, after the variable target temperature is set to the second variable target temperature.

* * * * *